United States Patent [19]
Lloyd et al.

[11] Patent Number: 5,664,192
[45] Date of Patent: Sep. 2, 1997

[54] METHOD AND SYSTEM FOR ACCUMULATING VALUES IN A COMPUTING DEVICE

[75] Inventors: Scott Edward Lloyd, Hoffman Estates; Shay-Ping Thomas Wang, Long Grove, both of Ill.

[73] Assignee: Motorola, Inc., Schaumburg, Ill.

[21] Appl. No.: 355,738

[22] Filed: Dec. 14, 1994

[51] Int. Cl.$^6$ .................................................. G06F 9/00
[52] U.S. Cl. .................................................. 395/672
[58] Field of Search .................................. 395/650, 700, 395/673, 672; 364/200

[56] References Cited

U.S. PATENT DOCUMENTS

| | | | |
|---|---|---|---|
| 3,611,300 | 10/1971 | Aldrizh | 340/172.5 |
| 4,379,326 | 4/1983 | Anastas | 364/200 |
| 4,905,143 | 2/1990 | Takahashi et al. | 364/200 |
| 5,113,523 | 5/1992 | Colley | 395/800 |
| 5,197,140 | 3/1993 | Balmer | 395/400 |
| 5,201,054 | 4/1993 | Dudhela | 395/800 |

*Primary Examiner*—Alvin E. Oberley
*Assistant Examiner*—Alice Y. Park
*Attorney, Agent, or Firm*—Michael K. Lindsey; Bruce E. Stuckman

[57] ABSTRACT

A method and system is described which allows execution overlap in a computer having a plurality of processing elements. The method and system provide an accumulation schedule based on the expected completion times of the processing elements. Outputs from the processing elements are accumulated according to the accumulation schedule. The accumulation schedule includes a plurality of accumulation flags which indicate when the outputs are to be accumulated.

19 Claims, 3 Drawing Sheets

METHOD AND SYSTEM FOR ACCUMULATING VALUES IN A COMPUTING DEVICE

RELATED INVENTION

The present invention is related to the following inventions which are assigned to the same assignee as the present invention:

(1) "Neural Network and Method of Using Same", having Ser. No. 08/076 601, filed on Jun. 14, 1993, now U.S. Pat. No. 5,517,667.

(2) "Controller for Operations in a Computer and Method of Using Same", having Ser. No. 364,889, filed on Dec. 27, 1995, now U.S. Pat. No. 5,611,063.

The subject matter of the above-identified related inventions is hereby incorporated by reference into the disclosure of this invention.

TECHNICAL FIELD

The present invention relates generally to computers and, in particular, to a method for accumulating data.

BACKGROUND OF THE INVENTION

In many computers, operations are grouped and executed within a specific period of time referred to as a cycle. For example, in some computer architectures, particularly ones used for digital signal processing (DSP), it is common to have a multiplication cycle, during which operands are multiplied, followed by an accumulation cycle, during which the results of the multiplication cycle are summed. Typically, cycles are executed sequentially; however, in more advanced computer architectures, cycles may be executed simultaneously.

FIG. 1 depicts a temporal presentation of conventional and overlapped compute-accumulate cycles. The conventional cycle 12 and overlapped cycle 14 are shown in reference to timeline 10. The conventional cycle 12 includes a compute cycle 16 and a subsequent accumulation cycle 18. Beginning at time $t_1$ and completing at time $t_3$, the compute cycle 16 indicates the period of time during which a set of operations is executed by a computer. Typically, these operations may include logic functions or arithmetic operations such as multiplication, division, addition, or subtraction. The accumulation cycle 18 begins sometime after the completion of the compute cycle 16, or, as shown in the example, immediately at the completion of the compute cycle 16. During the accumulation cycle 18, results from the operations of the compute cycle 16 are typically summed. Other arithmetic or logic operations may also be performed on the results during the accumulation cycle 18.

The overlapped cycle 14 includes a compute cycle 20 and accumulation cycle 22. Similar to compute cycle 16, compute cycle 20 represents the amount of time required to execute a set of operations. In the example shown, the execution of operations begins at time $t_1$ and ends at time $t_3$. However, in contrast to the conventional cycle 12, the accumulation cycle 22 begins sometime before the end of the compute cycle 20, at time $t_2$. The accumulation cycle 22 ends at time $t_4$, which may occur, as shown, after the completion of the compute cycle 22.

During the operation of a computer, the overlapped cycle 14 is desirable over the conventional cycle 12 because it allows the same number operations to be executed in a shorter amount of time, thus increasing the overall throughput of the computer. However, known techniques for overlapping compute and accumulation cycles suffer from a variety of drawbacks. First, prior art computers typically execute a fixed set of operations during the compute cycle. Overlap is thus allowed only for a small number of operations, and this in turn limits the effectiveness of execution overlap in improving the overall throughput of the computer. Another problem with current execution overlap techniques is that they require sophisticated communications protocols between cycles in some circumstances. For instance, using known protocols to accumulate results generated by a plurality of processing elements typically adds a significant amount of processing overhead. Generally, the overhead added by a communication protocol negatively affects the run-time performance of the computer.

Therefore, a need exists for a method and system of accumulating data values in a computer that offers improved run-time performance and flexibility in overlapping various operations.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

Generally, the present invention provides a method and system for accumulating a plurality of data values generated by one or more processing elements in a computer. This is accomplished according to the following steps. First, an expected completion time is determined for each of the processing elements. Next, an accumulation schedule is formed which is based on the expected completion times. Data values are then accumulated according to the accumulation schedule. Such a method and system provide a technique for accumulating data which increases the overall throughput of the computer. The present invention is more fully described as follows, with reference to FIGS. 2–6.

It will be understood by one of ordinary skill in the art that the method and system of the present invention may be implemented in hardware or software, or any combination thereof, and that the term "task" is defined by this disclosure to mean any action by a device which includes at least one logic, arithmetic, or data manipulation operation.

Figure 1:
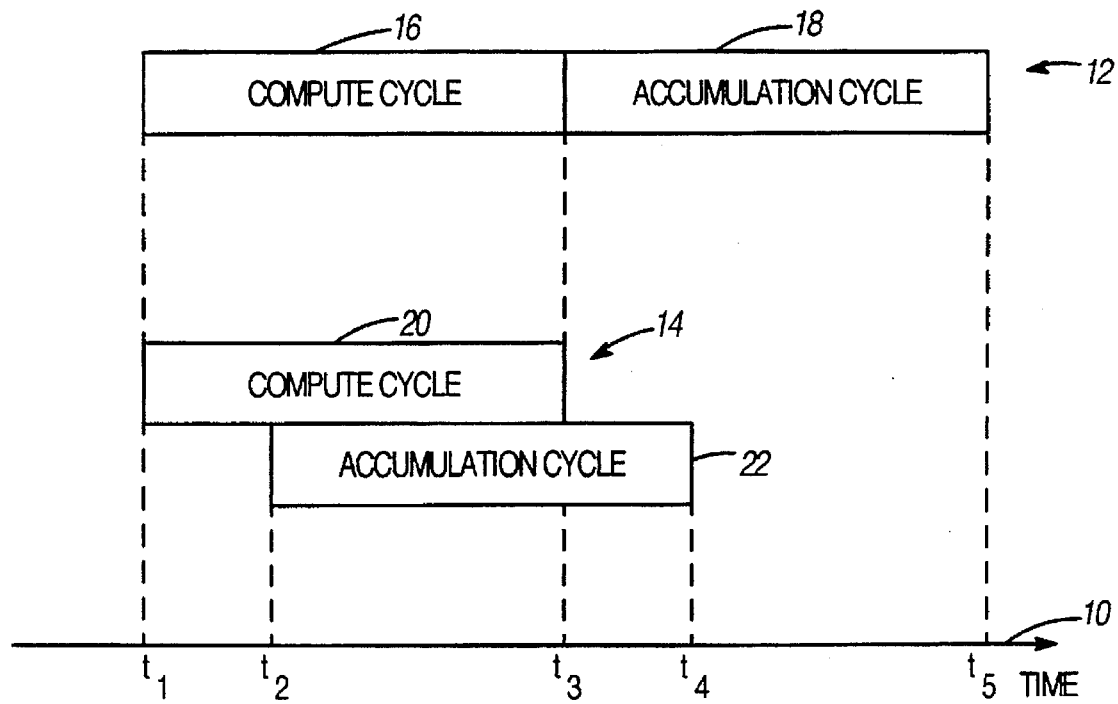
FIG. 1 depicts a temporal presentation of conventional and overlapped multiply-accumulate cycles.
Figure 2:
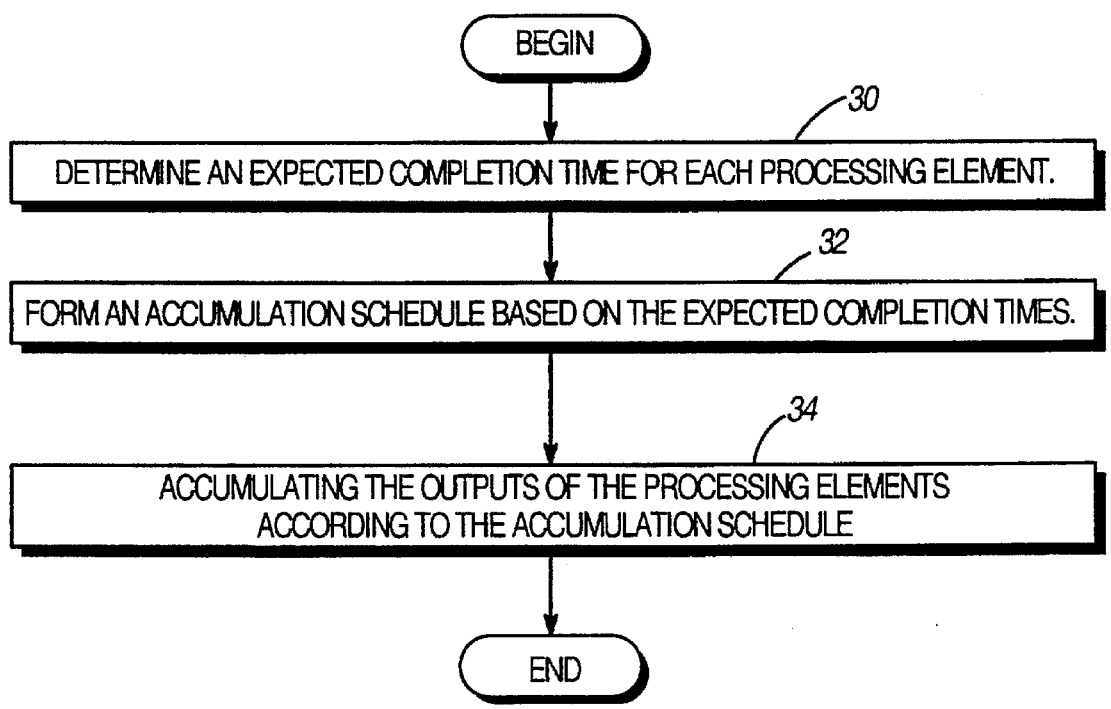
FIG. 2 illustrates a flow diagram of a method of accumulating data in accordance with one embodiment of the present invention.

FIG. 2 illustrates a flow diagram of a method of accumulating data in accordance with one embodiment of the present invention. This method may be used in a computer having a plurality of processing elements. Each of these processing elements receive an input signal and, in turn, produces an output signal corresponding to an output value.

In box 30, an expected completion time is determined for each of the plurality of processing elements. In box 32, an accumulation schedule is formed. The accumulation schedule is based on the expected completion time of each of the plurality of processing elements. Next, in box 34, plurality of output values are accumulated according to the accumulation schedule.

More particularly, in this embodiment, the expected completion time is determined by defining the operation of each of the processing elements as a sequence of events over time, wherein the sequence has a final event, having a final event time, which produces an output which is to be accumulated. The operation of a processing element may include any combination of logic or arithmetic operations. The expected completion time is a point in time at which the output is to be accumulated, and it may coincide with or occur sometime after the final event time.

The expected completion times of the processing elements are gathered together to form an accumulation schedule. An accumulation schedule dictates the order by which the outputs are to be accumulated. For instance, expected completion times may be organized in an accumulation schedule so that outputs from a certain set of processing elements are accumulated first, or preferably, so that outputs are accumulated according to their expected completion time. The first outputs to be completed are the first to be accumulated, etc. Further details of the accumulation schedule can be obtain by referring to FIGS. 4 and 5 hereindisclosed.

In a computer program, the method steps included in box 30 and 32 may be executed during a preprocessing phase of execution, while the method step included in box 34 may be executed during run-time execution. Organizing a computer program to execute in this fashion significantly increases the performance of the computer during run-time execution. Furthermore, the expected completion time may be a time stamp represented by a variable in a computer program; while an accumulation schedule is implemented in software as an array variable, or in hardware as software readable register containing digital values.

Figure 3:
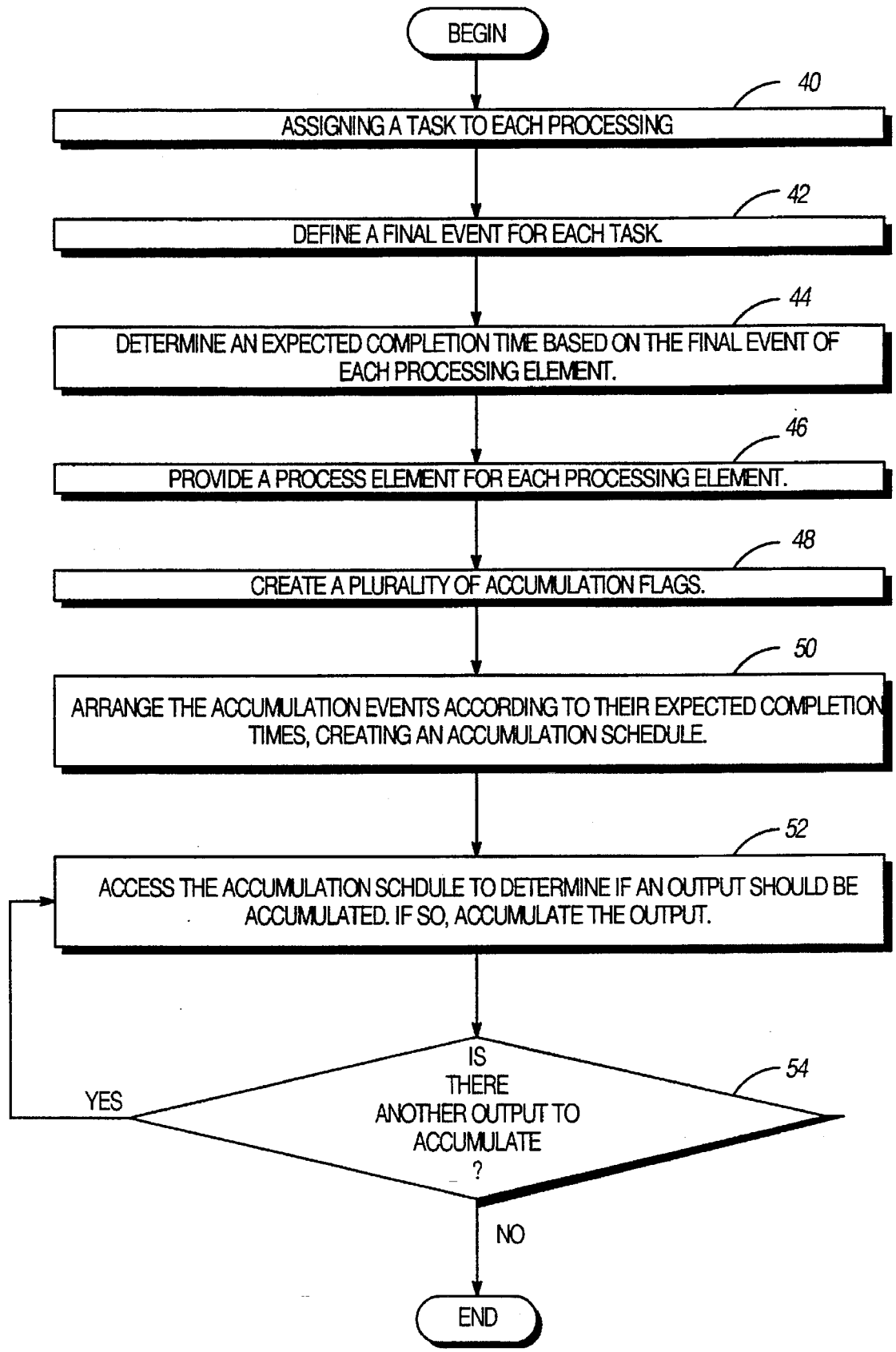
FIG. 3 illustrates a flow diagram of a method of accumulating data in accordance with a preferred embodiment of the present invention.

FIG. 3 illustrates a flow diagram of a method of accumulating data in accordance with a preferred embodiment of the present invention. In a preferred embodiment, this method is used in a multi-processor computer, which includes a plurality elements, to accumulate the outputs of the processing elements.

In box 40, a task is assigned to each of the plurality of processing elements, wherein the task produces at least one of the outputs in the form of an output signal in response to an input signal. In box 42, each task is defined as a sequence of events over time, wherein the sequence of events has a final event which produces the output. Next, in box 44, an expected completion time is determined based on a quantity relating to the final event of each of the tasks such as the time of the final event. In box 46, a processing element tag corresponding to one of the processing elements is provided. In box 48, a plurality of accumulation flags are created by associating the processing element tag with the expected completion time of each of the processing elements.

In box 50, the plurality of accumulation flags are arranged into an accumulation schedule according to their expected completion times. In a preferred embodiment, an accumulation flag having an earlier expected completion time than other flags is given a position in the schedule ahead of the other flags. Next, in box 52, the accumulation schedule is accessed to determine whether one of the plurality of outputs is accumulable, that is, is the output ready for accumulation. If so, the output is accumulated.

In decision box 54, a check is made to determine whether another output is to be accumulated. If so, the method returns to box 52. If not, the method terminates.

Figures 4, 5:
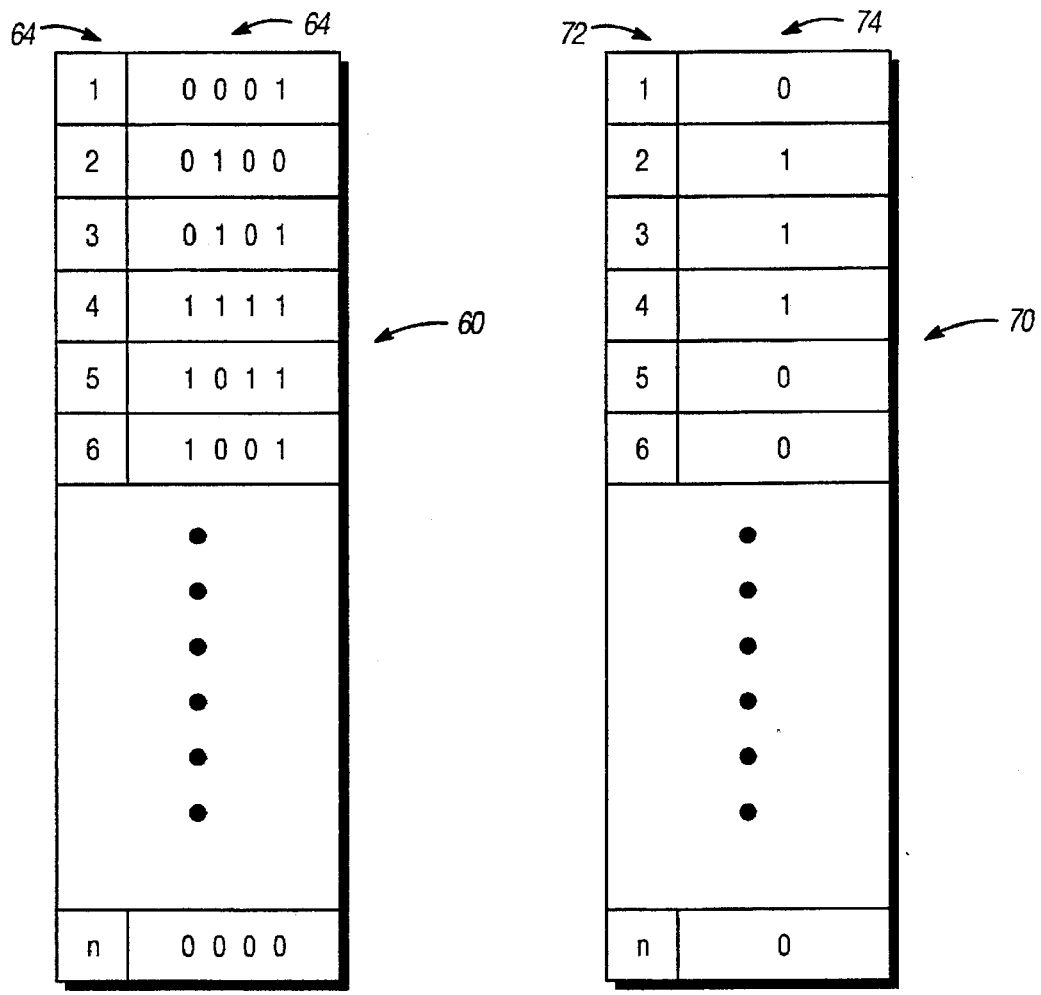
FIG. 4 illustrates an accumulation schedule in accordance with one embodiment of the present invention.
FIG. 5 illustrates an accumulation schedule in accordance with a preferred embodiment of the present invention.

FIG. 4 illustrates an accumulation schedule 60 in accordance with one embodiment of the present invention. In this embodiment, the processing element tag is a digital word which identifies one of the plurality of processing elements. For example, the tag could be an address identifying a memory location or an output port of the processing element. Each row in the accumulation schedule 60 represents an accumulation flag. The first column 62 gives the expected completion times for the processing elements. In this example, the values shown in the first column 62 represent a sequence of clock periods during a compute cycle. The values shown in the second column 64 include examples of processing element tags. In this case, the tags are four bit digital words; however, one of ordinary skill will realize that the digital words may be of any length. In clock periods where there are not any outputs to be accumulated, a null value is inserted in place of a processing element tag. This is shown in the example in the $n^{th}$ row of the accumulation schedule 60. In this case, the null value is represented by "0000".

Using either of the methods shown in FIGS. 2 and 3, for example, the accumulation schedule 60 would be accessed during each clock period and the respective processing element output would be subsequently accumulated. For instance, during the first clock period, the first row would be accessed and the output from processing element "0001" would be accumulated thereafter; during the second clock period, the second row would be accessed and the output from processing element "0100" would be accumulated thereafter; and so forth, until reaching the final clock period included in the accumulation schedule 60.

FIG. 5 illustrates an accumulation schedule 70 in accordance with a preferred embodiment of the present invention. In this embodiment, a processing element tag is a binary indicator which indicates whether one of the plurality of outputs is accumulable. Each row in the accumulation schedule 70 represents an accumulation flag. The values shown in the first column 72 represent a sequence of clock periods during a compute cycle. The values shown in the second column 74 include the preferred form of the processing element tags. In a preferred embodiment, the tags are single bits which indicate whether an output is to be accumulated. If the bit is one, the corresponding processing element output is accumulated. If the bit is zero, no accumulation occurs as a result of accessing the row. In order to use the single-bit tags for accumulating outputs according to the preferred embodiment, each processing element output must have a pre-assigned address. As an example, this address may correspond to a memory location, output port, or any other means which contains the processing element output.

Using either of the methods of FIGS. 2 and 3, for example, the accumulation schedule 70 would be accessed during each clock period, and if the tag is set to one, the respective processing element output would be accumulated shortly thereafter. In the preferred embodiment, the respective processing element output is determined from the single-bit tag according to a method disclosed in above-identified Related Invention No. 2. Briefly, this method involves using a counter to derive the address which corresponds to the processing element output. For instance, during the first clock period, the first row would be accessed and no accumulation would occur corresponding to the first clock period since the tag is zero. During the second clock period, the second row would be accessed and the output from processing element corresponding to the first address would be accumulated thereafter. During the third clock period, the third row would be addressed and the output from processing element corresponding to the second address would be accumulated thereafter. This process would repeat until reaching the final clock period included in the accumulation schedule 70.

The accumulation schedules 60, 70 shown in FIGS. 4 and 5 can be easily modified to include instances where more than one processing element output is to be accumulated during a clock period by adding additional columns (not shown) of processing element tags.

Figure 6:
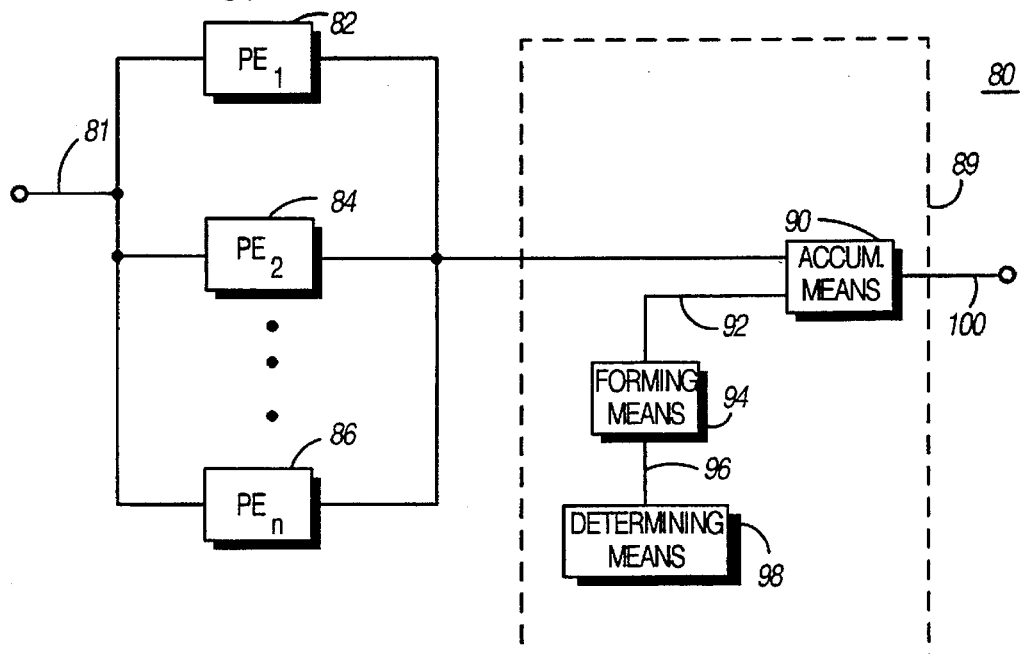
FIG. 6 illustrates a block diagram of a computer which includes a further embodiment of the present invention.

FIG. 6 illustrates a block diagram of a computer 80 which includes a further embodiment of the present invention. The computer 80 includes a plurality of processing elements and a system 89 for accumulating data values. In the example shown, the plurality of processing elements are represented by the three processing elements 82, 84, and 86. The system 89 includes a determining means 98, forming means 94, and accumulating means 90.

The determining means 98 determines an expected completion time for each of the plurality of processing elements. The determining means 98 accomplishes this by assigning a task to each of the plurality of processing elements. A task produces at least one of the plurality of outputs which are being accumulated. For each of the processing elements, the determining means 98 defines the task as a sequence of events over time, wherein the sequence of events has a final event which produces an output. The determining means 98 then correlates the expected completion time to the final event.

The forming means 94 is operatively coupled to the determining means 98 by a data path 96. The forming means 94 forms an accumulation schedule based on the expected completion time of each of the plurality of processing elements. The accumulation schedule includes a plurality of accumulation flags, and the forming means 94 creates the plurality of flags by associating a processing element tag with the expected completion time of each of the plurality of processing elements. The forming means arranges the plurality of flags into a sequence within the accumulation schedule so that a first flag having an earlier expected completion time than a second flag occurs before the second accumulation flag in the sequence. In one embodiment, the forming means 94 provides an accumulation schedule 60 as shown in FIG. 4; while in another embodiment, the forming means provides an accumulation schedule 70 as shown in FIG. 5.

The accumulating means 90 receives outputs from the plurality of processing elements across data bus 88 and accesses the accumulation schedule via data path 92. The accumulating means 90 accumulates outputs according to the accumulation schedule which is provided by the forming means 94. The accumulating means 90 may include an adder which adds the outputs to a sum.

In one embodiment of the present invention, the computer 80 implements a polynomial expansion of which the general form is represented by Equation 1 as follows:

$$y = \sum_{i=1}^{m} w_{i-1} x_1^{g_{1i}} x_2^{g_{2i}} \ldots x_n^{g_{ni}}$$ Equation (1)

where $x_i$ represent the inputs received on input bus 81 and can be a function such as $x_i = f_i(zj)$, where $zj$ is any arbitrary variable, and where the indices i, j, and m may be any integers; where y represents the output 100 of the computer 80; where $w_{i-1}$ represent the coefficient for the ith term; where $g_{1i}, \ldots g_{ni}$ represent the exponents for the ith term and are integers; and n is the number of inputs. In this embodiment, the operations involved in computing the terms are performed by the plurality of processing element, represented by the processing elements 82, 84, and 86, and the summation of the terms is performed by the system 89.

In one embodiment of the present invention, the accumulation means 90 is implemented in an integrated circuit, while the forming means 94 and determining means 98 are implemented by software running on a processor such as a microprocessor. One of ordinary skill will recognize that the functions of system 89 could also be implemented by any other combination of hardware and software, or by a programmable logic array, application specific integrated circuit (ASIC), or other logic device.

In summary, the present invention provides both a method and system for accumulating data values in a computer. By determining an accumulation schedule during the preprocessing stage of a computer program, the overall throughput of the computer during run-time execution will be greatly increased. One key advantage of the present invention is that the accumulation schedule can be organized in a manner that allows execution overlap between the operations of various stages in a computer.

While specific embodiments of the present invention have been shown and described, it will be apparent to those skilled in the art that the disclosed invention may be modified in numerous Ways and may assume many embodiments other than the preferred form specifically set out and described above.

Accordingly, it is intended by the appended claims to cover all modifications of the invention which fall within the true spirit and scope of the invention.

What is claimed is:

1. In a computer which includes a plurality of processing elements, each processing element generating at least one of a plurality of output values, a method for accumulating the plurality of output values, the method comprising the,, following steps:

determining an expected completion time for each of the plurality of processing elements;

forming an accumulation schedule based on the expected completion time of each of the plurality of processing elements; and accumulating the plurality of output values according to the accumulation schedule, each of the plurality of output values being based on a polynomial term having a form $$w_{i-1} x_1^{g_{1i}} x_2^{g_{2i}} \ldots x_n^{g_{ni}},$$

where $x_1, \ldots x_n$ represent a plurality of processing element inputs, $w_{i-1}$ represents a coefficient, $g_{1i} \ldots g_{ni}$ represent a plurality of exponents, and i and n represent integers.

2. The method of claim 1, wherein the step of determining includes the following substeps:

assigning a task to each of the plurality of processing elements, wherein the task produces the at least one of the plurality of output values in response to at least one input value;

for each of the processing elements, defining the task as a sequence of events over time, the sequence of events having a final event with a corresponding final event time, the final event producing the at least one of the plurality of output values; and for each of the processing elements, determining the expected completion time based on the final event.

3. The method of claim 1, wherein the step of forming includes the following substeps:

generating a processing element tag corresponding to one of the plurality of processing elements;

creating an accumulation flag by associating the processing element tag with the expected completion time of the one of the plurality of processing elements; and including the accumulation flag in the accumulation schedule.

4. The method of claim 3, wherein the processing element tag is a digital word which identifies the one of the plurality of processing elements.

5. The method of claim 3, wherein the processing element tag is a binary indicator which indicates whether one of the plurality of output values is accumulable.

6. The method of claim 3, wherein the steps of generating, creating, and including are repeated for each of the plurality of processing elements, whereby creating a plurality of accumulation flags which are included in the accumulation schedule.

7. The method of claim 6, further comprising the step of:

arranging the plurality of accumulation flags into a sequence within the accumulation schedule, wherein a first accumulation flag having an earlier expected completion time than a second accumulation flag occurs before the second accumulation flag in the sequence.

8. The method of claim 1, wherein the step of accumulating includes the following substeps:

accessing the accumulation schedule to determine whether one of the plurality of output values is accumulable; and if the one of the plurality of outputs is accumulable, adding the one of the plurality of outputs to a sum.

9. In a multi-processor computer which includes a plurality of processing elements, a method for accumulating a plurality of outputs from the plurality of processing elements, the method comprising the following steps:

(a) assigning a task to each of the plurality of processing elements, wherein the task produces at least one of the plurality of outputs, each of the plurality of outputs being based on a polynomial term having a form $$w_{i-1} x_1^{g_{1i}} x_2^{g_{2i}} \ldots x_n^{g_{ni}}.$$

where $x_1 \ldots x_n$ represent a plurality of processing element inputs, $w_{i-1}$ represents a coefficient, $g_{1i} \ldots g_{ni}$ represent a plurality of exponents, and i and n represent integers;

(b) for each of the processing elements, defining the task as a sequence of events over time, the sequence of events having a final event which produces the at least one of the plurality of outputs;

(c) for each of the processing elements, defining an expected completion time based on the final event;

(d) providing a processing element tag corresponding to one of the plurality of processing elements;

(e) creating an accumulation flag by associating the processing element tag with the expected completion time of the one of the plurality of processing elements;

(f) repeating steps (d)–(e) for each of the plurality of processing elements, whereby creating a plurality of accumulation flags;

(g) arranging by expected completion time the plurality of accumulation flags to form an accumulation schedule, wherein a first accumulation flag having an earlier expected completion time than a second accumulation flag precedes the second accumulation flag in the accumulation schedule; and (h) accessing the accumulation schedule to determine whether one of the plurality of outputs is accumulable, if so, accumulating the one of the plurality of outputs.

10. The method of claim 9, wherein step (h) is repeated until each of the plurality of outputs has been accumulated.

11. The method of claim 9, wherein step (h) includes adding the one of the plurality of outputs to a sum.

12. The method of claim 9, wherein the processing element tag is a digital word which identifies the one of the plurality of processing elements.

13. The method of claim 9, wherein the processing element tag is a binary indicator which indicates whether an output of the one of the plurality of processing elements is accumulable.

14. In a computer which includes a plurality of processing elements having a plurality of outputs, a system for accumulating the plurality of outputs, the system comprising:

determining means for determining an expected completion time for each of the plurality of processing elements;

forming means, operatively coupled to the determining means, for forming an accumulation schedule based on the expected completion time of each of the plurality of processing elements; and accumulating means, operatively coupled to the forming means and the plurality of processing elements, for accumulating the plurality of outputs according to the accumulation schedule, each of the plurality of outputs being based on a polynomial expansion having a form $$w_{i-1} x_1^{g_{1i}} x_2^{g_{2i}} \ldots x_n^{g_{ni}},$$

where $x_1 \ldots, x_n$ represent a plurality of processing element inputs, $w_{1-1}$ represents a coefficient, $g_{1i} \ldots g_{ni}$ represent a plurality of exponents, and i and n represent integers.

15. The system of claim 14, wherein the accumulation schedule includes a plurality of accumulation flags and the forming means creates the plurality of accumulation flags by associating a processing element tag with the expected completion time of each of the plurality of processing elements.

16. The system of claim 15, wherein the forming means arranges the plurality of accumulation flags into a sequence within the accumulation schedule so that a first accumulation flag having an earlier expected completion time than a second accumulation flag occurs before the second accumulation flag in the sequence.

17. The system of claim 15, wherein the processing element tag is a digital word which identifies one of the plurality of processing elements.

18. The system of claim 15, wherein the processing element tag is a binary indicator which indicates whether one of the plurality of outputs is accumulable.

19. The system of claim 14, wherein the accumulating means includes an adder which adds the plurality of outputs to a sum.

* * * * *

UNITED STATES PATENT AND TRADEMARK OFFICE
CERTIFICATE OF CORRECTION

PATENT NO. : 5,664,192
DATED : Sept. 2, 1997
INVENTOR(S) : Scott E. Lloyd and Shay-Ping T. Wang It is certified that error appears in the above-indentified patent and that said Letters Patent is hereby corrected as shown below:

In column 8, line 7 "lime" should read --time--

Signed and Sealed this

Seventeenth Day of February, 1998

Attest:

BRUCE LEHMAN

Attesting Officer

Commissioner of Patents and Trademarks